Patented Feb. 6, 1934

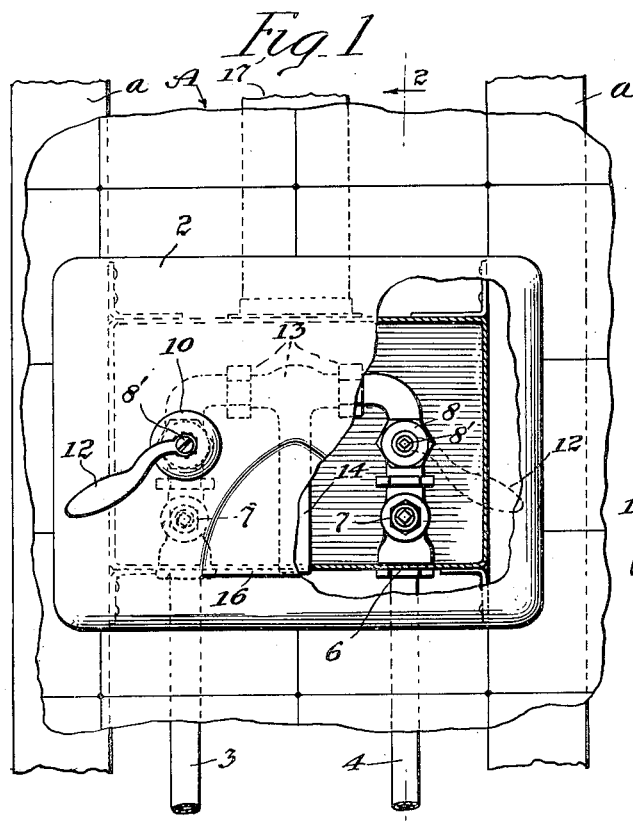

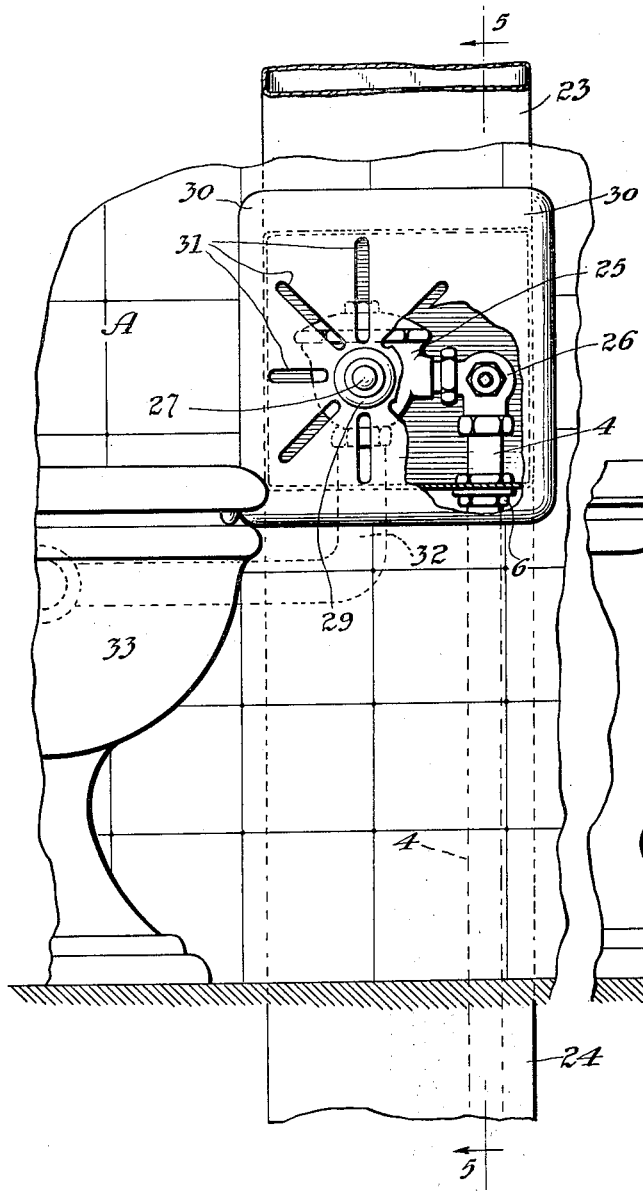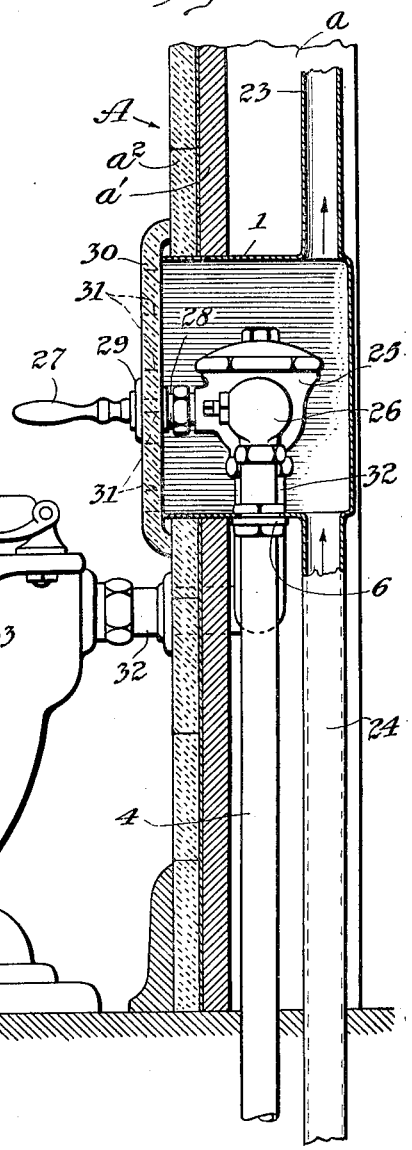

1,946,207

UNITED STATES PATENT OFFICE 1,946,207

PLUMBING INSTALLATION

George W. Haire, Chicago, Ill.

Application September 10, 1928
Serial No. 304,866

11 Claims. (Cl. 137—111)

The invention relates to plumbing installations. A particular object of the invention is to simplify and standardize plumbing installations for sinks, lavatories, toilets, and the like, and to provide plumbing installations in which the valves, valve stems and faucets will be concealed, either wholly or in considerable part, thus providing for the use of fittings in connection with such installations in the condition in which they are cast, without the finishing and machining now almost universally employed on such fittings in connection with present-day installations, in which they are exposed; while, at the same time, providing for convenient inspection of and access to the fittings, as shut-off valves, when desired.

A further object of the invention is to provide a plumbing installation of the general type specified, which includes means for ventilating a room in which such installation is made.

Incidentally, also, it is an object of the invention to provide a plumbing installation to which an artistic appearance may readily be imparted without appreciably increasing the cost of the installation.

To attain the objects of the invention, a plumbing installation embodying my invention and improvements comprises a housing adapted to be secured in a wall to define a wall opening, a supply pipe or pipes leading thereto, means for securing said pipe or pipes to said housing, a shut-off valve or valves to control said supply pipe or pipes, a service valve or valves connected with said supply pipe or pipes, and a discharge connection from said service valve or valves, said shut-off and service valves being positioned within said housing, a removable cover plate for the wall opening defined by said housing provided with an opening or openings through which the valve stem or stems of said service valve or valves project, and which renders devices contained in said wall opening conveniently accessible for purposes of inspection, repair, replacement, and the like.

As the invention relates to providing means for ventilating the room, I attain the object of the invention by providing a ventilating duct or passageway in the wall in which the housing which defines the wall opening is installed, said housing being provided with an opening which communicates with said ventilating duct or passageway, and the cover plate for the opening defined by said housing being provided with an opening or openings for the passage of air from said room to said housing and thence to the duct or passageway which communicates therewith, the draft of said ventilating duct or passageway—whether induced or natural—operating to maintain a circulation of air from the room through the openings in the cover plate of the housing and thence into and through the duct or passageway to a desired point of discharge.

A plumbing installation embodying my invention and improvements also comprises the various other features, combinations of features, and details of construction hereinafter described and claimed.

In the accompanying drawings in which my invention is fully illustrated—

Fig. 1 is a front view with the cover plate partly broken away, of an installation embodying the invention.

Fig. 2, a section taken on line 2—2 of Fig. 1;

Fig. 3, a view similar to Fig. 2, but showing a modification;

Fig. 4, a view similar to Fig. 1, but showing another modification; and,

Fig. 5, a section taken on line 5—5 of Fig. 4.

Describing the invention with reference to the drawings and referring, in the first instance, to Figs. 1 and 2, A designates the wall of a room as a whole, comprising studding $a$, the spaces between which are closed on the inside by a wall-covering $a'$, the inner surface of which is finished in any desired manner, as by tile, indicated at $a^2$. The outer sides of the spaces between the studdings will be closed by a suitable outer wall covering, not shown.

Secured in the wall A is a housing 1, the inner side of which is open, and which is secured to the studs $a$, as shown, with its open side substantially flush with the inner surface of the wall A. Said housing thus defines a recess or opening in said wall which normally is adapted to be closed by a removable cover plate 2. As shown, the housing protrudes from the wall A and the cover plate 2 is flanged to fit thereover whereby said cover plate is definitely located on the wall.

Supported in the wall A, in a usual manner, are water supply pipes 3 and 4, the ends of which, remote from said housing, are adapted to communicate respectively with suitable sources of supply of hot and cold water under pressure, not shown.

As shown, the pipes 3 and 4 extend through holes formed in the wall of the housing 1—as shown in the bottom wall thereof—said holes being preferably somewhat larger than the outside diameters of said pipes, thus providing for limited lateral adjustment of said pipes relative to each other and to fittings contained in said housing, to which said pipes are connected in operation, as presently described. As shown, said pipes are connected to the housing by nuts 6 threaded to the pipe outside of the wall of the housing 1 and the end faces of the casings of shut-off valves 7 threaded to the ends of the pipes 3 and 4, which project inside of the housing 1, said nuts 6 and shut-off valves 7 being adjusted so that the wall of the housing will be clamped between them, thus providing rigid supports for said pipes. The shut-off valves 7 are of a usual type, the movable valve members of which are adapted to be manipulated to open and close said valves, respectively by means of valve stems, which, in accordance with my invention, are located entirely within the wall opening defined by the housing 1, as shown.

My improved plumbing installation also comprises service valves 8, each of which is connected to the discharge end of a shut-off valve 7 in any usual manner, as by a nipple or coupling.

In accordance with my invention, the service valves 8 are mounted so that the casings thereof will be positioned entirely within the wall opening defined by the housing 1 but with the valve stems 8' thereof projecting outwardly through and beyond the open side of said housing, the cover plate 2 being provided with holes through which said valve stems extend. Said removable cover plate renders the fittings positioned within the wall opening defined by the housing 1, conveniently accessible for purposes of inspection, repair, replacement, and the like. As shown, said cover plate is secured in position to close said wall opening by means of flanged bushings 10 which extend through holes or openings formed in the cover plate—being the openings through which the valve stems extend—said bushings having screw-threaded engagement with tubular extensions 11 formed on the packing glands for the bearings of said valve stems.

Secured to the projecting outer ends the valve stems of the service valves 8 are handles 12 for manipulating said valves.

Connected to the discharge openings of both service valves 8 is a T-fitting 13, connected to the discharge opening of which is a spout 14, the discharge end of which is directed through an opening 15 formed in the cover plate 2, a hood 16 being formed around the upper side of said opening, shaped and proportioned to conceal said spout 14.

With the described construction, it is obvious that, in a finished installation the shut-off valves 7, the service valves 8, and the spout 14, will be entirely concealed, the only parts of the installation which will be exposed to view, being the outer ends of the valve stems of the service valves 8 and operating handles 12 secured thereto. It is thus rendered possible to utilize fittings in the condition in which they are cast, without finishing or machining of any kind, except such as is necessary to provide screw threads and the like for making necessary attachments thereto. Obviously, a great economy will thus be effected in the cost of the fittings of the installation.

As the invention relates to providing means for ventilating the room in which the installation is made, I attain this object of the invention by providing a ventilator duct 17, which is positioned in the wall space between adjacent studs a, the lower end of which is connected to an opening 18 formed in a wall, as shown in the top wall, of the housing 1, the opposite end of which may extend to a desired point of discharge, preferably outside of the building.

With this construction, it is obvious that the draft of the ventilating duct 17, whether natural or induced, will create a current of air inwardly through the opening 15 in the cover plate 2 through the housing 1, and thence to and through the ventilating duct 17, thus continuously changing the air in the room.

As a modification of the plumbing installation shown in Figs. 1 and 2, I contemplate a construction in which the spout, instead of being concealed as shown in said Figs. 1 and 2, is exposed, the discharge end thereof projecting at the front side of the cover plate 2, as shown, and, if desired, said projecting portion of the spout may be utilized for securing the cover plate 2 in position.

Also, as a further modification, I dispense entirely with the ventilating duct 17, shown in Figs. 1 and 2, and instead leave the inner end of the housing 1 open and provide holes in the cover plate 2 to permit air to pass therethrough into the housing 1, and also provide a discharge from the wall space defined by the studs between which the housing 1 is positioned, to atmosphere.

This modification is shown in Fig. 3 of the drawings, and excepting as regards features last above generally described, the parts of the installation are substantially identical in construction with corresponding parts of the installation shown in Figs. 1 and 2 and are designated by the same reference characters.

As regards the modifications shown in said Fig. 3, 19 designates the projecting front end of the discharge spout, which forms a separate part and has screw-threaded engagement with the end of the spout section 14 on the T 13, a hole or opening 20 being formed in the cover plate through which the screw-threaded end of said spout section 14 projects. In order to utilize said spout section 19 as a means of attaching the cover plate in position, a flange 21 is formed at the end thereof which is connected to the spout section 14, the diameter of said flange 21 being somewhat greater than the diameter of the hole 20 so that its outer edge will project over and bear against the outer side of the cover plate 2. With this construction, it is obvious that when the spout section 19 is screwed upon the spout section 14, the inner surface of the flange 21 will be brought into engagement with the outer surface of the cover plate 2 and will exert a pressure against the same which will secure said cover plate in position.

To provide for ventilating the room in which the installation is made, I attain the object of the invention in accordance with said modified construction by providing holes 22 in the cover plate 2 and leaving the enclosed inner end of the housing 1 open, whereby the interior of said housing will be in open communication with the wall space formed by the studs a between which said housing is positioned. Discharge to atmosphere from the wall space with which the housing 1 communicates is effected by providing a suitable outlet connection from said wall space to atmosphere, which may either be through the outer covering of the wall or the roof, as may be desired.

Secured to the projecting outer ends the valve stems of the service valves 8 are handles 12 for manipulating said valves.

In Figs. 4 and 5, I have illustrated the application of the invention to a water closet flush bowl. In this instance the housing 1 is provided with an air duct 23, leading from the top thereof and an air duct 24 leading into the bottom thereof. A single water supply pipe 4 leads into the bottom of housing 1, and is there connected with a flush valve 25 through shut-off valve 26. The flush valve 25 is operable by the usual lever 27, operating through a nipple 28, projecting through a hole in the cover plate 30, said cover plate being held in place, as shown, by means of a flanged bushing 29, threaded on the nipple 28. The cover plate 30 is provided with ventilating openings 31 permitting the entry of air into the air duct 23 through the housing 1. A discharge pipe 32 leads from the flush valve 25 into the water closet bowl 33. By this arrangement the invention is applied to an ordinary water closet flush bowl construction, and when so applied, has the same advantages as have been outlined above.

While I have illustrated and described the preferred forms of construction for carrying my invention into effect, these are capable of variation and modification without departing from the spirit of the invention. I therefore do not wish to be limited to the precise details disclosed but desire to avail myself of such variations and modifications as fall within the scope of the appended claims.

I claim:

1. In a plumbing installation, the combination of a housing adapted to be secured in a wall to define a wall opening, a supply pipe leading thereto, means for securing said pipe to said housing, a discharge member for said supply pipe, a service valve which controls the discharge from said supply pipe and which is positioned within the wall opening defined by said housing, and a removable cover for said wall opening provided with an opening through which the valve stem of the service valve projects.

2. In a plumbing installation, the combination of a housing adapted to be secured in a wall to define a wall opening, a supply pipe leading thereto, means for securing said pipe to said housing, a discharge member for said supply pipe, a shut-off valve and a service valve which control the discharge from said supply pipe and which are positioned within the wall opening defined by said housing, and a removable cover for said wall opening provided with an opening through which the valve stem of the service valve projects.

3. A plumbing installation as specified in claim 1, in which the cover for the wall opening defined by the housing is provided with an opening for said discharge member.

4. A plumbing installation as specified in claim 1, in which the cover for the wall opening defined by the housing is provided with an opening for said discharge member and comprises a hood which extends over said opening concealing said opening and discharge member.

5. A plumbing installation as specified in claim 1, which also comprises a ventilating flue in the wall, and in which the housing which defines the wall opening is provided with an opening which communicates with said ventilating flue and in which, also, the cover for said wall opening is provided with an opening or openings for admitting air to said housing, whereby the draft of said ventilating flue will operate to withdraw air from the room.

6. In a plumbing installation, the combination with a wall having studs, of a supporting member secured to a stud or studs in the space between adjacent studs, said wall being provided with an opening affording access to said member, a supply pipe in said wall, means for securing said pipe to said supporting member, a valved discharge member for said pipe, a cover plate for said opening, operating means for said valve which projects through a hole formed in said cover plate, and means for holding said cover plate in place.

7. In a plumbing installation, the combination with a wall having studs, of a supporting member, secured to a stud or studs in the space between adjacent studs, said wall being provided with an opening affording access to said member, a supply pipe in said wall, means for securing said supply pipe to said member; a valved discharge member for said pipe; a cover plate for said opening; operating means for said valve which projects through a hole formed in said cover plate; and means associated with said operating means for holding said cover plate in place.

8. In a plumbing installation, the combination with a wall having studs, of a supporting housing arranged between and secured to the studs of the wall, said housing defining a wall opening; a supply pipe in said wall and extending into and secured to said housing; a valved discharge member for said pipe connected thereto within said housing; a cover plate for said opening; operating means for said valve projecting through said opening and through said cover plate; and means associated with said operating means for holding said cover plate in place.

9. In a plumbing installation, the combination with a wall having studs, of a housing arranged between and secured to the studs of said wall, said housing defining a wall opening, a supply pipe leading into and secured to a wall of said housing; a shut-off valve connected with said supply pipe; a service valve connected with said shut-off valve; a cover plate for said wall opening; a tubular casing extending from said service valve through said cover plate; a flanged bushing threaded on said casing and holding said cover plate in place; and operating means for said service valve projecting through said tubular casing.

10. In a plumbing installation, the combination with a wall having an opening therein, of a housing having an open end secured in said wall opening and protruding slightly therefrom; a supply pipe leading into and secured to said housing; a service valve within said housing and connected with said supply pipe; a cover plate flanged to fit over the protruding edges of said housing; means for securing said cover plate in place; and means for operating said service valve projecting through said cover plate.

11. In a plumbing installation, the combination with a wall having an opening therein of an open ended housing secured in said wall opening with its edges protruding therefrom; a cover plate flanged to fit over the protruding edges of said housing; a supply pipe leading into and secured to said housing, a service valve which controls the discharge from said supply pipe, positioned within said housing, a tubular discharge member from said service valve which projects through an opening formed in said cover plate, a flanged member threaded to said tubular discharge member for holding said cover plate in place, and means for operating said service valve which projects through an opening formed in said plate.

G. W. HAIRE.